No. 796,220. PATENTED AUG. 1, 1905.
J. P. JONES.
THREADLESS PIPE COUPLING.
APPLICATION FILED AUG. 16, 1904.
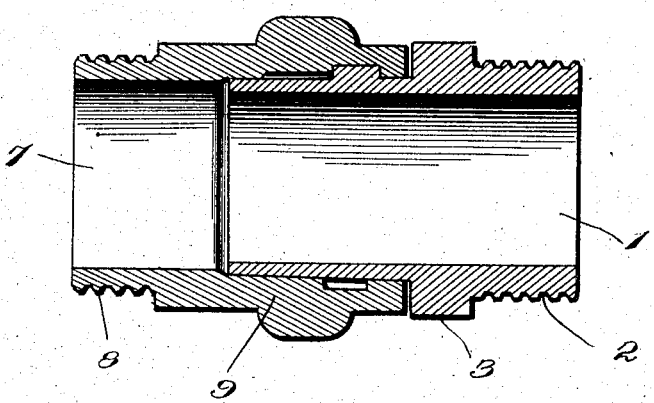
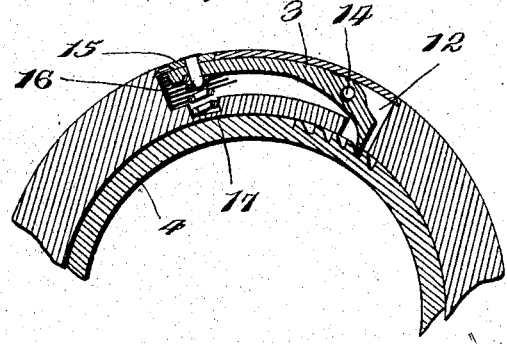
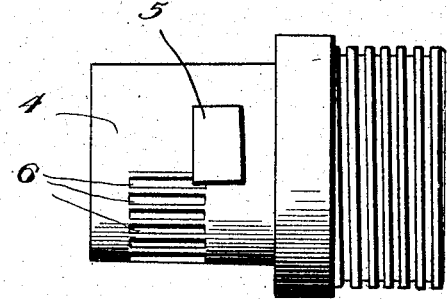
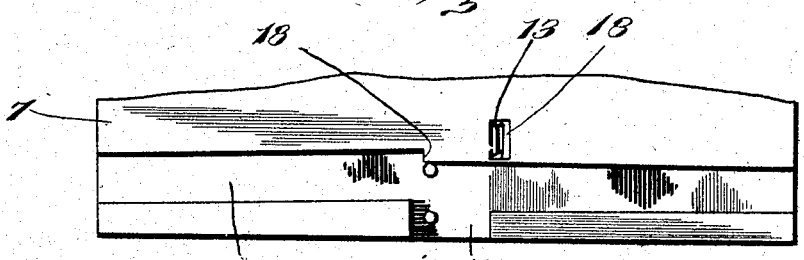
Witnesses
Alex Franklin
H. A. Robinette
Inventor
John Paul Jones
By Knight Bros
Attorneys

UNITED STATES PATENT OFFICE.

JOHN PAUL JONES, OF CHARLESTON, ILLINOIS.

THREADLESS PIPE-COUPLING.

No. 796,220.        Specification of Letters Patent.        Patented Aug. 1, 1905.

Application filed August 16, 1904. Serial No. 220,974.

*To all whom it may concern:*

Be it known that I, JOHN PAUL JONES, a citizen of the United States, residing at Charleston, in the county of Coles and State of Illinois, have invented certain new and useful Improvements in Threadless Pipe-Couplers, as fully set forth in the following specification.

In the drawings, Figure 1 is a vertical longitudinal section of a coupler embodying my invention. Fig. 2 is a side elevation of one of the couplers detached. Fig. 3 is a detail sectional view illustrating the fastening means. Fig. 4 is a development of the interior cylindrical wall.

1 represents one of the members of the coupler, having suitable exterior screw-threads 2, upon which a hose or other conducting tubular medium may be secured. This member is provided with an annular projection 3, which may be serrated to facilitate the manipulation of the parts. The member 1 is provided with a tubular extension 4. On the periphery, at a predetermined point, is formed a lug or projection 5.

6 is a series of teeth formed in the periphery of the tubular extension 4. As will be seen in Fig. 2, the projectional lug 5 is positioned in the plane of the series of teeth.

The other member of the coupler is designated by the reference-numeral 7 and is provided with exterior screw-threads 2 of the member 1. This member 7 is provided with an extension 9, the bore of which is more or less tapered, as will be seen in Fig. 1. 10 is a groove formed in the wall of the extension 9, said groove being spiral, as will be clearly seen from Fig. 4. The top wall of the groove is cut away, as at 11, whereby the two members of the coupler may be assembled by passing the lug or projection 5 of the member 1 down through the cut-away portion 11. This member 7 is provided with a recess 12, within which is pivoted a dog 13 by means of the pivot 14, one end of said dog being adapted for engagement with series of teeth 6, as illustrated in Fig. 3. The other end of the dog is provided with a push-button 15, which is flush with the periphery of the extension 9.

16 is a coiled spring one end of which is seated under that end of the dog which carries the push-button 15, the other end of said spring being seated in a recess 17, formed in the extension 9.

18 is an opening through the wall of the extension 9 of the member 7, through which the nose of the dog projects, as more clearly seen in Fig. 3.

To separate the parts from the locked position shown in Fig. 1, the thumb is pressed upon the push-button 15, whereby the dog is swung upon its pivot 14, thus elevating its nose and disengaging it from the series of teeth 6 on the member 1, whereby the members are free to be separated.

The extension 4 of the member 1 is, as will be seen from the drawings, tapered to a certain extent to insure a close fit within the tapered bore of the member 7, and this fit is sufficiently snug to prevent the water or other fluid passing through the coupling from leaking past the joint.

To make the coupling, the member 1 is placed in a position relative to the member 2, so that the lug or projection 5 registers with the cut-away portion 11 of the spiral groove 10, whereupon the member 1 may be slipped into the bore of member 7 until the downward movement is stopped by the bottom of the spiral groove immediately in line with the cut-away portion 11. The members are then turned in opposite directions until the lug 5 strikes the shoulder 18$^a$ in the spiral groove 10. The members are held in this position by reason of the engagement of the nose of the dog with the teeth 6 and held in such locked position until the dog is disengaged from the teeth by the depression of the thumb-piece or push-button 15.

From the above it will be seen that by my invention I have produced an automatic threadless coupler which can be quickly connected and locked so that the members can be separated. Such coupler will be found useful in connection with the hose of fire departments, hydrants, and air-brake systems for railway-trains.

Having thus described my invention, what I claim, and desire to secure by Letters Patent, is—

In a pipe-coupling, the combination of a female member having a tapering inner wall, a slot extending inwardly from one end of the member, and an unbroken groove extending spirally from one side of the slot around the member to the other side of the slot, the bottom wall of the rear end of the groove being below the top wall of the front end of the groove; and a male member provided with a tapering outer wall and a single projection on its outer wall adapted to enter the slot and the groove of the female member.

The foregoing specification signed this 30th day of July, 1904.

JOHN PAUL JONES.

In presence of—
  A. R. BRIDGES,
  MOSES KERSHAW.